Aug. 11, 1970   J. S. BARTLETT   3,524,059
FRONT-LOADING SPOT-FILMER
Filed Sept. 11, 1967   6 Sheets-Sheet 1
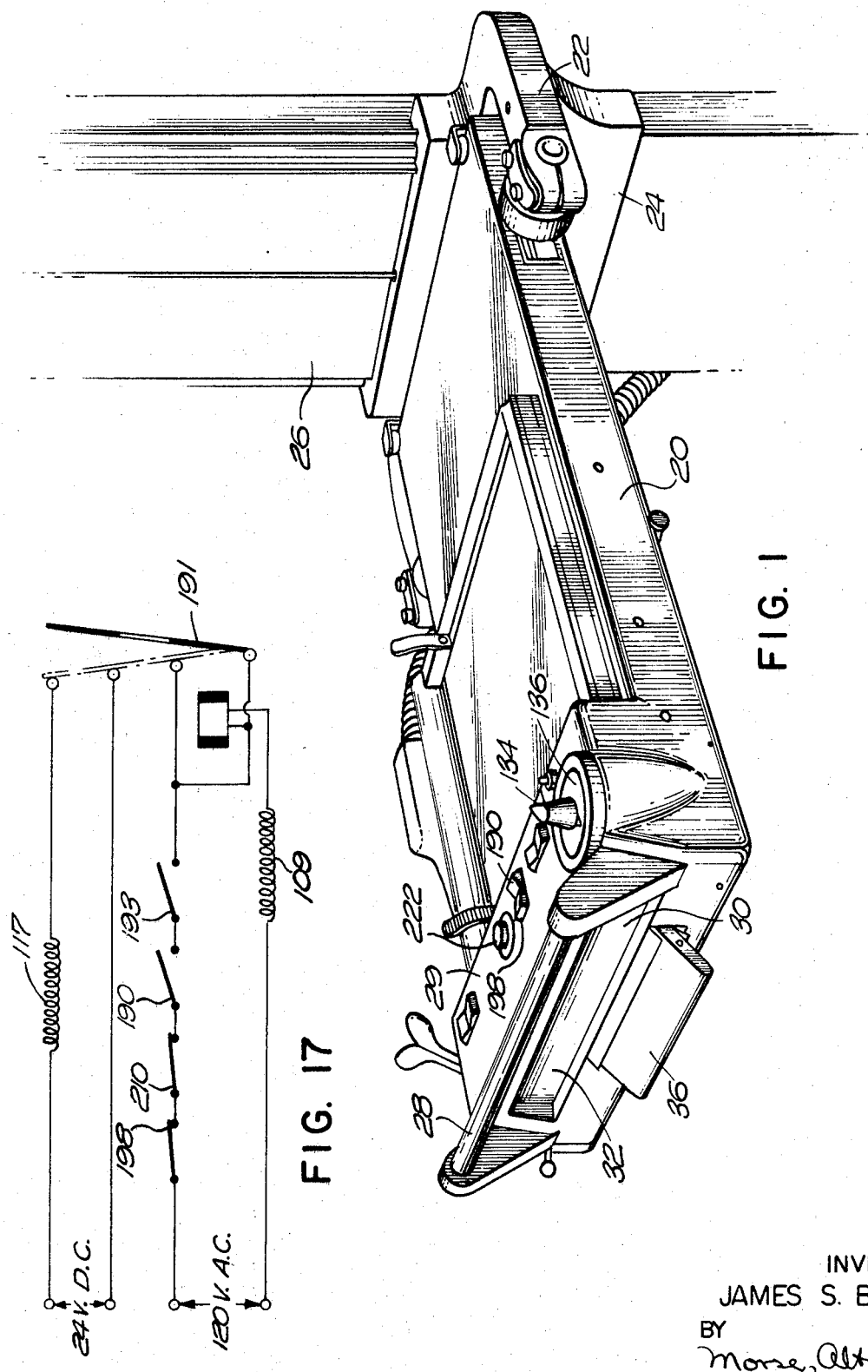
INVENTOR.
JAMES S. BARTLETT
BY
Morse, Altman & Oates
ATTORNEYS

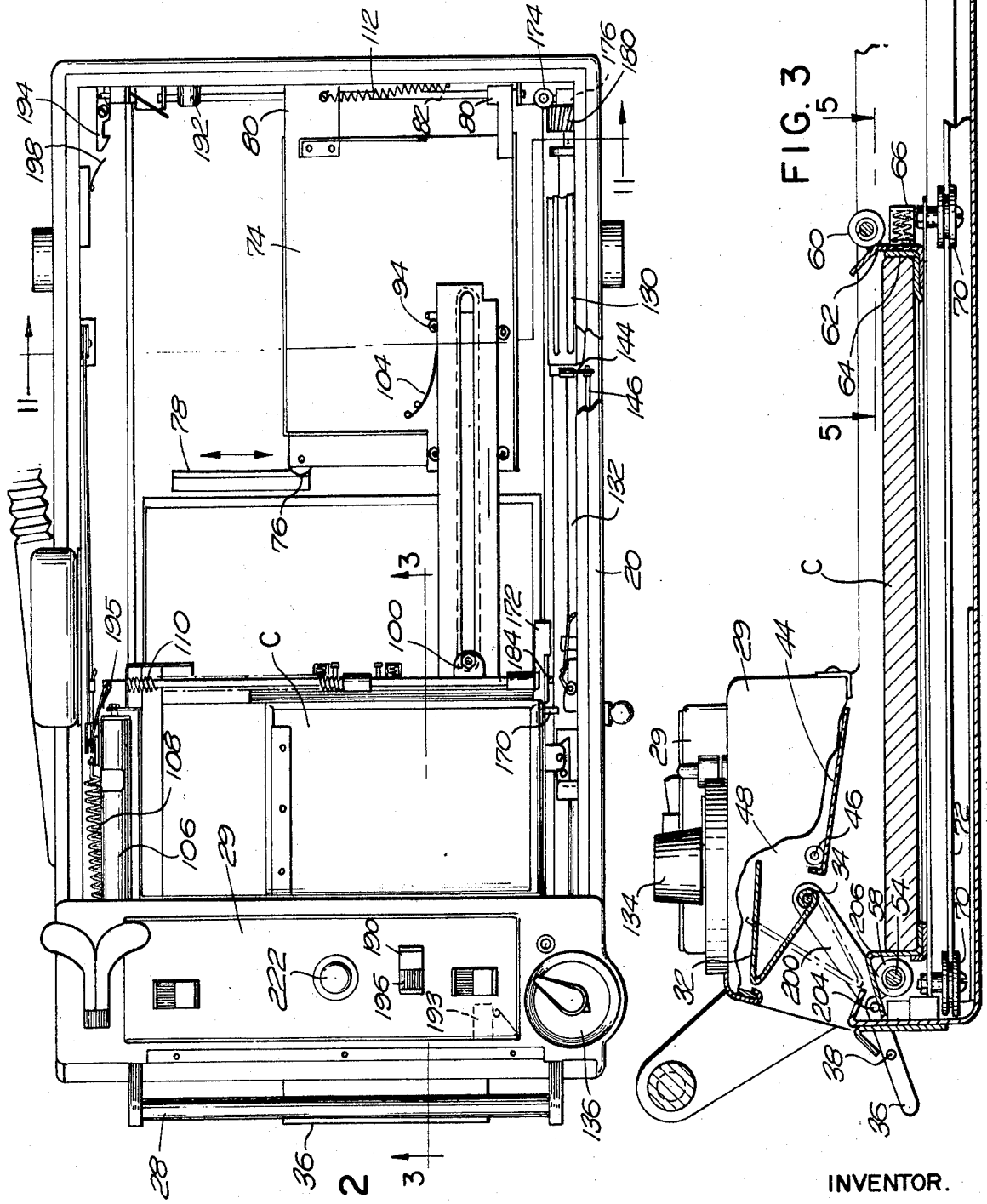

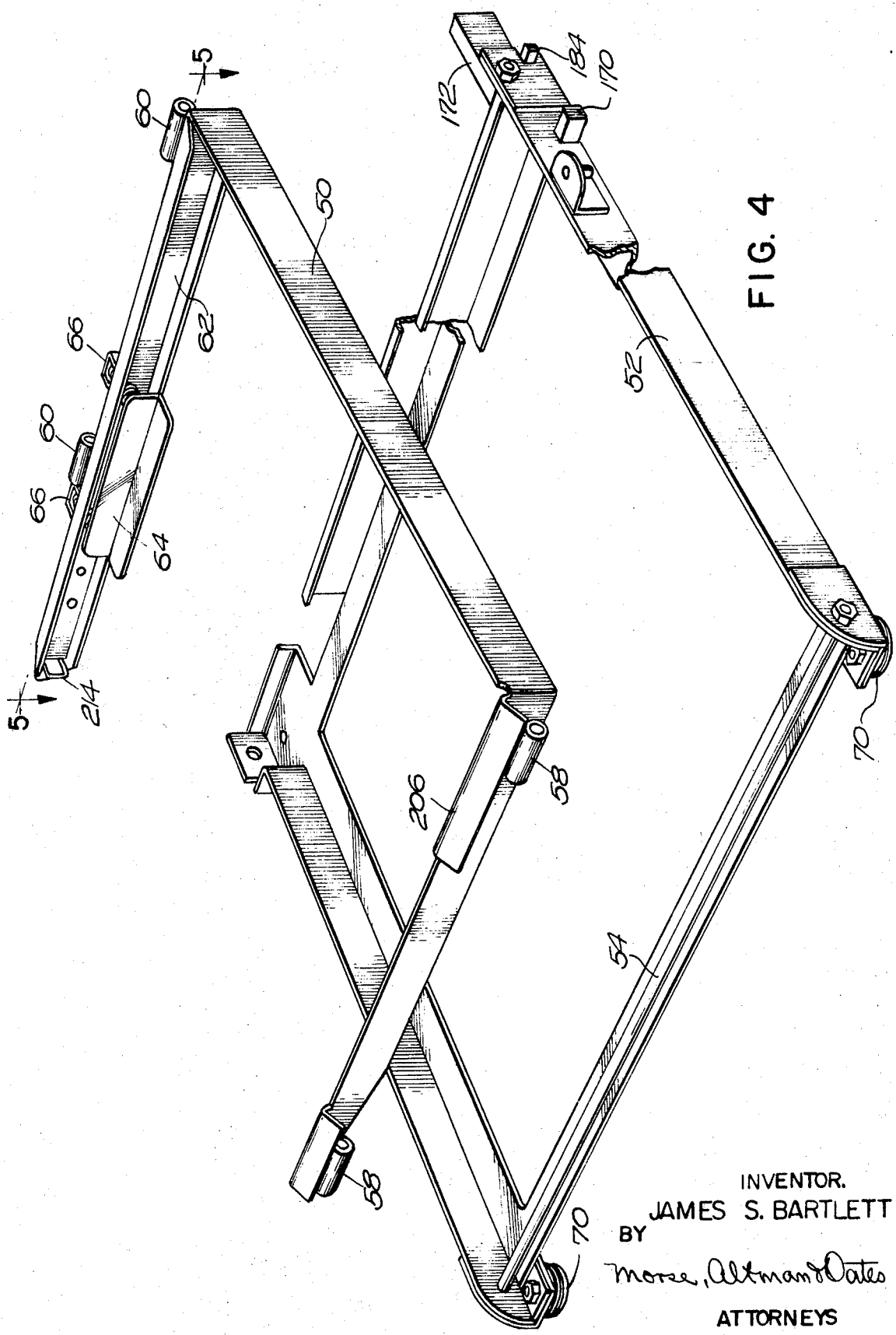

Aug. 11, 1970  J. S. BARTLETT  3,524,059
FRONT-LOADING SPOT-FILMER

Filed Sept. 11, 1967  6 Sheets-Sheet 4

INVENTOR.
JAMES S. BARTLETT
BY
Morse, Altman & Oates

ATTORNEYS

Aug. 11, 1970  J. S. BARTLETT  3,524,059
FRONT-LOADING SPOT-FILMER
Filed Sept. 11, 1967  6 Sheets-Sheet 6
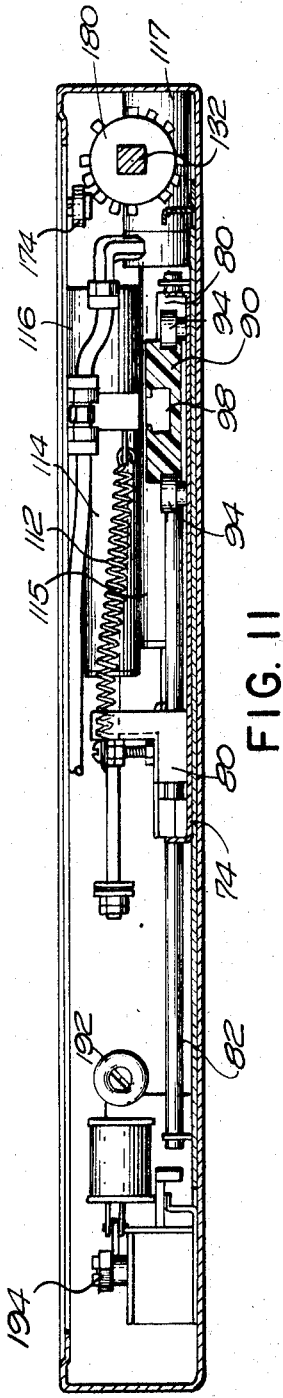
FIG. 11
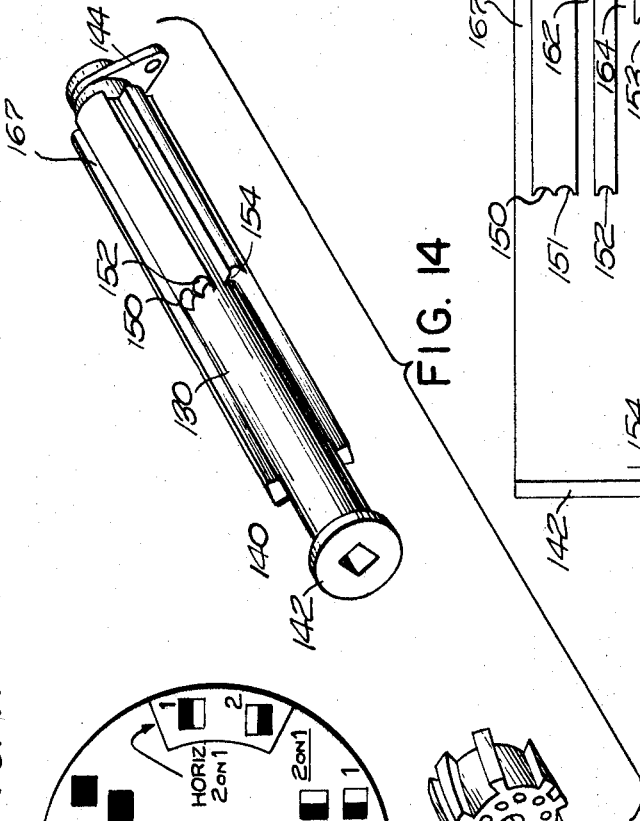
FIG. 14
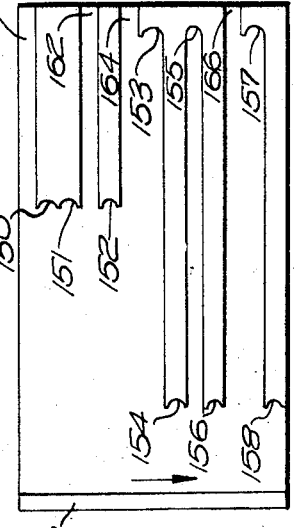
FIG. 15
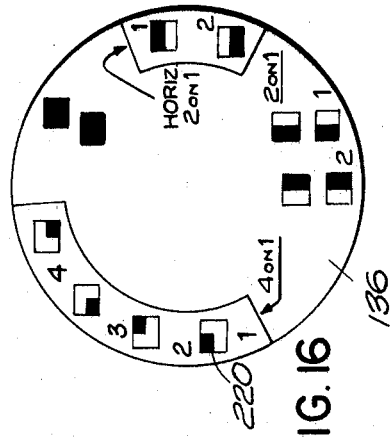
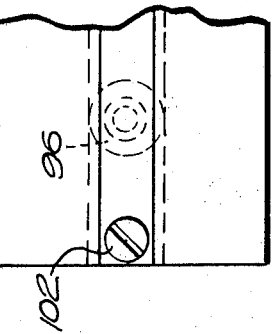
FIG. 16
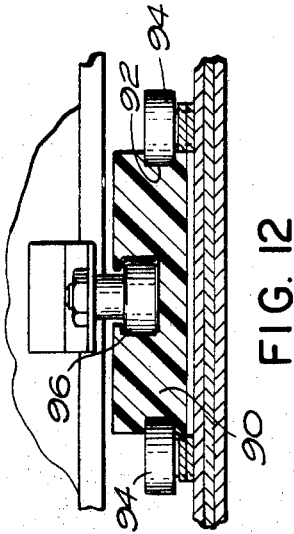
FIG. 12
FIG. 13
INVENTOR.
JAMES S. BARTLETT
BY
Morse, Altman & Oates
ATTORNEYS United States Patent Office 3,524,059
Patented Aug. 11, 1970

3,524,059
FRONT-LOADING SPOT-FILMER
James S. Bartlett, West Medford, Mass., assignor to Frank Scholz X-Ray Corp., Boston, Mass., a corporation of Massachusetts
Filed Sept. 11, 1967, Ser. No. 666,653
Int. Cl. G03b *41/16*
U.S. Cl. 250—66                                       6 Claims

ABSTRACT OF THE DISCLOSURE

An X-ray spot-filmer is loaded by inserting a cassette through the front wall of the frame and deflecting the cassette downward to enter a carriage at a level lower than that of the entrance aperture. Under the control of a programming mechanism the carriage automatically carries the cassette to one or more positions for exposures, the movements of the carriage being executed by springs or pneumatic means. The carriage is connected mechanically to the actuating means by a telescoping switch track so that it is never disengaged from the actuating means. Various interlocks are provided to prevent malfunctioning of the apparatus when a cassette is improperly inserted or a control button is pressed at the wrong time.

---

This invention relates to a front-loading X-ray spot-filmer having a frame or table on which a carriage is movable longitudinally from a loading position at the front end to the rear end, then forward by stages to positions for exposing all or successive portions of the cassette to radiations. On the carriage is a cassette holder which is movable transversely when required by the setting of the programming device. It is an object of the invention to simplify the mechanical means connecting the cassette holder to its actuating means, a telescoping switch track being provided so that the holder is never disengaged from the actuating means. This makes for reliable operation.

The cassette is inserted through an opening in the front wall of the table and is deflected downward into the holder which is lower than the opening. After a cassette has been exposed and advanced to the loading position, an ejector handle is manually operated to lift the forward end of the cassette to the level of the opening, and a spring operates to push the cassette part way through the opening so that it is readily grasped and withdrawn from the table. An interlock is provided which prevents operation of the ejector handle unless the carriage is in position for ejection or loading.

Other improved features are included in the detailed description of the invention which follows, and are illustrated on the drawings, of which FIG. 1 is a perspective view of a spot-filmer;

FIG. 2 is a plan view of the same with the cover removed and an 8" x 10" cassette in place;

FIG. 3 is a sectional view on the line 3—3 of FIG. 2, of the forward portion of the device, on a larger scale;

FIG. 4 is an enlarged perspective view of the carriage and cassette holder, separated;

FIG. 11 is a section on the line 11—11 of FIG. 2, on a larger scale;

FIG. 12 is a magnified detail of FIG. 11;

FIG. 13 is a fragmentary plan view of the switch track shown in FIGS. 2 and 10, on a larger scale;

FIG. 14 is an exploded view of selector cylinder and cam wheel shown in FIG. 2, on a larger scale;

FIG. 15 is a plane development of the surface of the cylinder shown in FIG. 14;

FIG. 16 is a plan view of the program dial shown in FIG. 1, on a larger scale; and FIG. 17 is a wiring diagram of two of the device employed to insure proper functioning of the apparatus.

Figure 5:
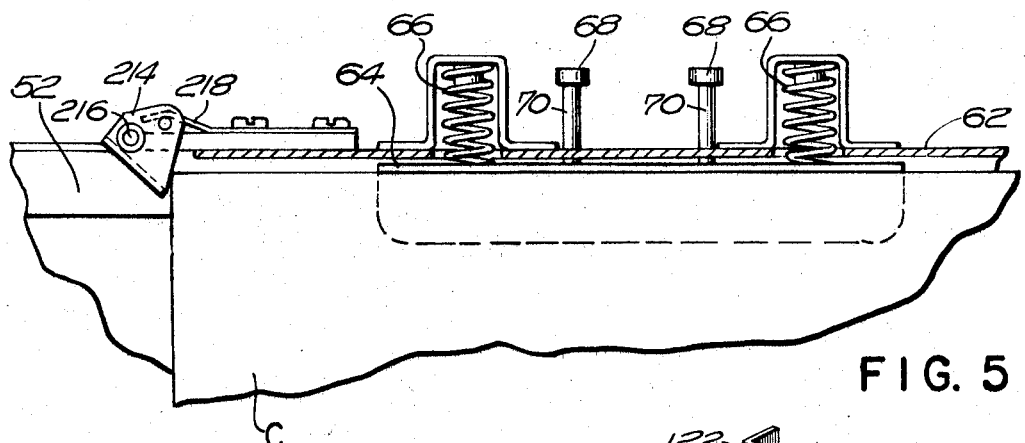
FIG. 5 is a fragmentary enlarged sectional view, on the line 5—5 of FIG. 4, of the rear portion of the upper carriage.

The frame or table 20 of a spot-filmer is shown in FIG. 1 rockably mounted between the arms 22 of a carriage 24 which is vertically adjustable on a tower 26. At the forward end of the table 20 is a handle 28 by which the table can be swung upward to a vertical position, and an elevated housing 29 containing some of the operating parts. In the front wall of the table is an enlongated aperture 30 through which a cassette can be introduced into the spot-filmer and discharged therefrom. In the housing 29 is a closure member 32 (FIGS. 1 and 3) which is rockable about a pivot 34 to open or close the aperture 30. Below the aperture 30 is an ejector handle 36 which is pivoted at 38 and is pulled up manually to eject a cassette from within as hereinafter described.

Figure 9:
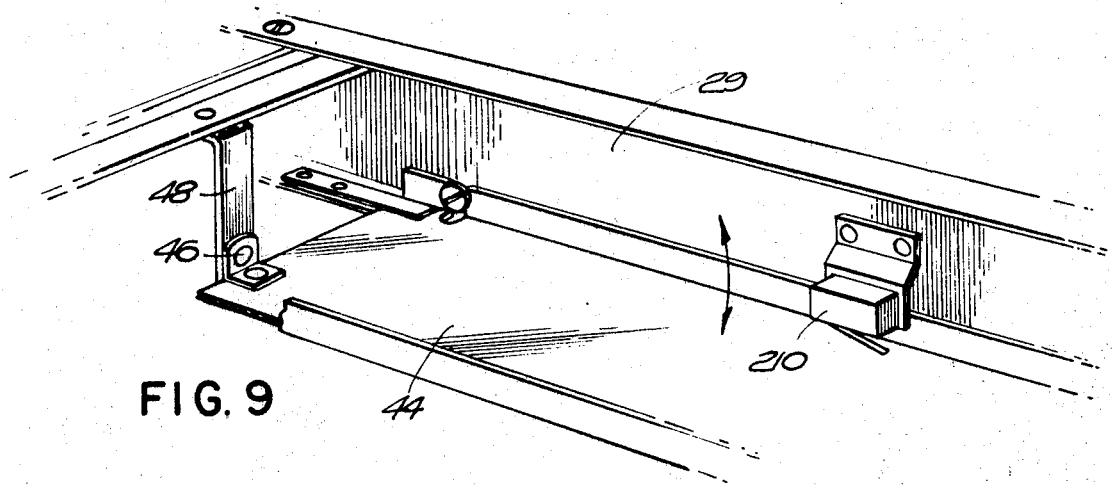
FIG. 9 is a fragmentary perspective view of the deflector plate and frame to which it is pivoted.
Figure 10:
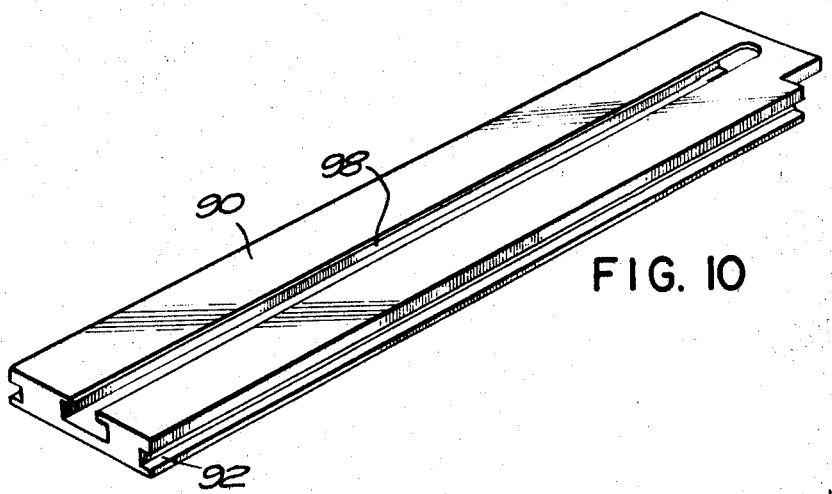
FIG. 10 is a perspective view, on a larger scale, of the switch track shown in FIG. 2.

When a cassette C is thrust through the aperture 30, it strikes a deflector plate 44 which is hinged as at 46 to brackets 48 (FIGS. 3 and 9). The plate 44 deflects the cassette downward into a holder 50. (FIG. 4) which consists of an angle strip forming three sides of a rectangle, the open side being toward the left. The holder 50 is transversely slidable on a carriage 52 which is an open rectangular frame having transverse rods 54 and 56 at its front and rear ends to support the holder 50. The holder has two linear ball-bearings 58 which slide on the rod 54 and two similar bearings 60 which slide on the rod 56. The rear wall 62 of the holder 50 carries a short angle piece 64 which is pressed against the wall 62 when a cassette is inserted in the holder as indicated in FIG. 5. Two springs 66 are arranged to press the angle piece 64 forward, the distance of movement forward being limited by the heads 68 of pins 70 which extend from the angle piece 64 through holes in the wall 62. When a cassette C is in the holder in the forward position (as in FIG. 3) manual operation of the ejector handle 36 will lift the forward edge of the cassette clear of the forward wall of the holder 50, whereupon the springs 66 acting through the angle piece 64 will thrust the cassette forward so that it projects from the aperture 30 where it is readily grasped for removal.

Figure 6:
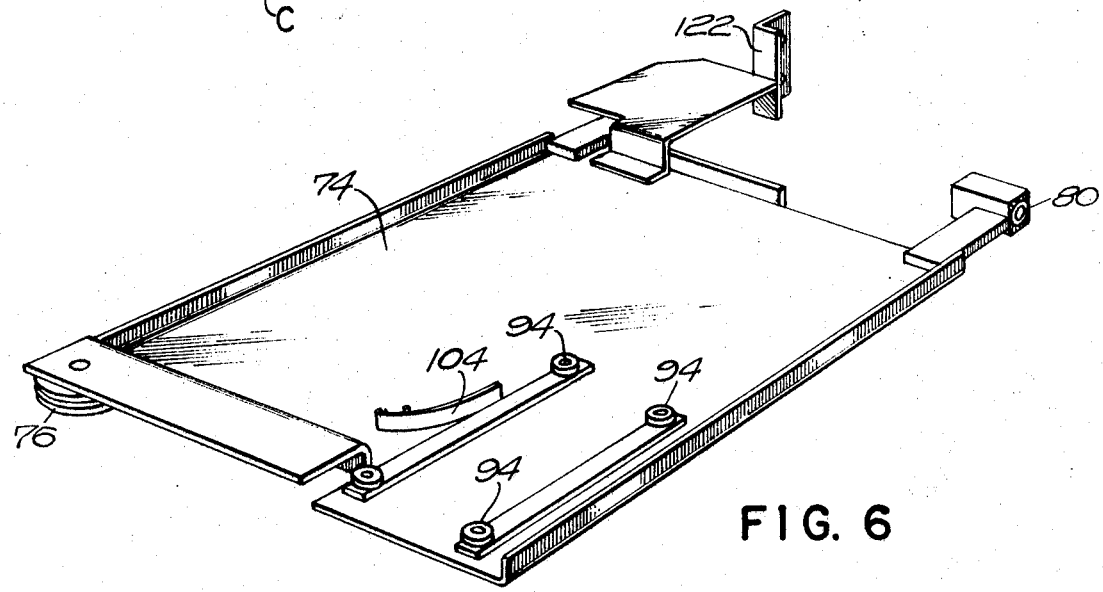
FIG. 6 is a perspective view of the carrier shown in FIG. 2, but on a larger scale.

The carriage 52 moves from the front loading position to the rear parking position and return. For this purpose it is provided with grooved wheels 70 at its corners which run on tracks 72 within the side walls of the table 20. When the carriage 52 is in the rear (parking) position, it is above a carrier 74 (FIG. 6) which is a rectangular plate having at one of its corners a grooved wheel 76 running on a transverse track 78, and bearings 80 at its rear corners sliding on a transverse rod 82. The holder 50 is connected to the carrier 74 by a telescoping switch track 90 (FIGS. 10–13) which consists of an elongated bar of a synthetic resin (for lightness) having lateral grooves 92 in which ride four wheels 94 mounted on the carrier 74 (FIG. 6) to keep the switch track 90 oriented in the front to rear direction but to permit free movement longitudinally with respect to the carrier. When the carrier moves from right to left or reverse, it takes the switch track 90 and the holder 50 with it, the holder being constantly connected to the switch track by a roller 96 which rides in an undercut groove 98 in the top of the switch track 90. The roller 96 is carried by an ear 100 mounted at the rear of the holder 50. A stop 102 is in the forward end of the groove 98 to keep the roller 96 in the groove when the holder 50 is moved forward with the carriage 52. A leaf spring 104 is mounted on the carrier 74 to press frictionally against a side of the switch track 90 to check the momentum of the switch track when it is impelled in one direction or the other by the rapidly moving holder 50 in its travels rearward or forward.

Figure 7:
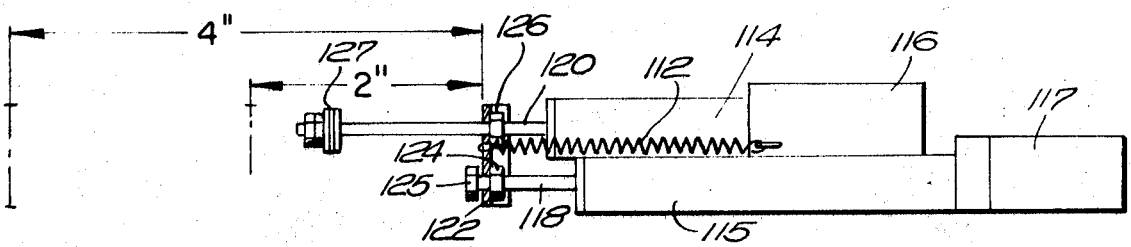
FIG. 7 is an elevation of pneumatic means for moving the cassette holder transversely.

Actuation of the carriage 52 and holder for rearward movements to the parking position is by a pneumatically operated piston in a cylinder 106, such movements being against the pull of a spring 108 which is employed to advance the carriage and holder forward from the parking position. Admission of compressed air into the cylinder 106 is controlled by a valve operated by a solenoid 109 (FIG. 17). To move the holder 50 and carrier 74 from left to right, a spring 110 is provided on the rod 56 to press against one of the bearings 60, and another spring 112 is attached to the carrier 74. Movements of the holder 50 and carrier 74 from right to left are brought about by pneumatic means at the rear end of the table 20, comprising two cylinders 114, 115 containing pistons which actuate piston rods 120, 118 respectively (FIG. 7). These rods extend through holes in an ear 122 on the carrier 74. The ear 122 is between nuts 124 and 125 on the rod 118. On the rod 120 are two nuts 126 and 127 on opposite sides of the ear 122 but spaced two inches apart. Admission of compressed air into the cylinders 114 and 115 is controlled by the usual valves operated respectively by solenoids 116 and 117. When air is admitted to the cylinder 114, the nut 126 on the rod 120 presses against the ear 122 and moves the carrier 74 and holder 50 two inches toward the left. When air is admitted to the cylinder 115, the nut 124 on the rod 118 moves the carrier and holder four inches to the left from the same starting point. These movements are to locate a cassette in different positions transversely of the table for exposures as hereinafter described.

For stopping the carriage at various points in its travels lengthwise of the table 20 to be in proper position for exposures, a selector cylinder 130 is mounted within the right hand side wall of the table 20 on an elongated shaft 132 much of which is square in section so that the cylinder can slide freely along the shaft but must rotate with it. The shaft 132 is connected by bevel gears and a short vertical shaft (not shown) to a program selector knob 134 (FIG. 1) over a dial 136 (FIG. 16). The cylindrical surface of the cylinder 130 is grooved longitudinally, some of the grooves terminating at different distances from a portion 140 of the cylinder which is of reduced diameter so that a flange 142 is at the rear end of the cylinder. At the forward end of the cylinder an ear 144 projects radially outward and is secured to the end of a rod 146 (FIG. 2) which extends forward to a dash-pot (not shown) to cushion the stopping of the carriage when it is drawn forward by the spring 108. The location of the stopping points of the carriage when it is moved forward is determined by the stops 150 to 158 on the cylinder as indicated on the plane development of the surface of the cylinder in FIG. 15. The grooves 162, 164, 166 and 167 go all the way through to the forward end of the cylinder. The stops and open grooves correspond to the diagram on the dial 136. A lug 170 projects from a side of the carriage 52 to ride in one or another of the grooves in the cylinder 130 when the carriage is moving in the rear portion of the table 20. Thus when the carriage is moved to the parking position at the rear, the lug 170 passes through one of the through grooves, engages the flange 142 and pushes the cylinder 130 to the rear position shown in FIG. 2. As it reaches this position a dog 172 which projects rearward from a corner of the carriage engages a small roller 174 to retract a small locking plunger 176 (FIG. 2) from a hole 178 (FIG. 14) in a short cylinder 180 which is secured to the rear end of the shaft 132. This releases the cylinders 180 and 130 for rotation. The cylinder 180 has a number of longitudinal grooves 182 at an angle to the axis such that the end of one groove is in axial line with the other end of the next groove so that when a dog 184 carried by the carriage 52 passes through a groove 182, it rotates the cylinders 180 and 130 one step which brings the next successive groove 182 into line with the path of the dog 184. This dog is pivotally mounted so that it can ride over the lands between the grooves 182 when the carriage moves forward. As indicated in FIG. 14, there are four grooves 186 of extra width to permit the dog 184 to move to the rear of the cylinder 180 without turning it. These wide grooves are aligned with the through grooves 162, 164, 166 and 167 in the cylinder 130 so that initial movements of the carriage to the parking position do not cause indexing of the cylinders. When a cassett has been loaded into the holder 50, the carriage then being in the loading position, a "return" button 190 on the housing 29 is pressed to close a relay switch 191 (FIG. 17), causing the carriage and holder to travel rapidly to the parking position by means of a piston in the pneumatic cylinder 106, a rubber bumper 192 being provided at the rear wall of the table to cushion the impact. The return button 190 is in series with a normally open cassette position switch 193 (FIGS. 2 and 17). When the carriage 52 is in its loading position it holds the switch 193 closed. The carriage is held in the parking position by a latch 194 which catches an upstanding lug 195 on the carriage. The arrival of the carriage at the parking position unlocks the cylinder 180 so that the selector knob 134 can be turned manually to the desired program indicated on the dial 136. This brings the corresponding groove of the cylinder 130 into line with the lug 170. When the a"advance" button 196 is pressed to release the latch 194, the spring 108 pulls the carriage 52 and holder 50 forward until they are stopped by one of the stop elements on the selector cylinder 130 at a proper position for an exposure.

When the carriage 52 is in the parking position it opens a normally closed "return stop" switch 198 which is in series with the advance button 196. Thus the carriage cannot be advanced except from the parking position so that after such advance to any position forward of the parking position no further advance can be had until the carriage has been returned to the parking position. Such return is automatically brought about after each exposure by circuitry not shown on the drawings.

The carriage and holder will accept either a 10" x 12" cassette or an 8" x 10" cassette. In either case the cassette must be inserted with the 10" dimension from front to rear. For some multiple exposure programs for an 8" x 10" cassette, transverse movements of the holder are required. These are brought about by its constant connection with the carrier 74. The latter is moved transversely by pistons in the pneumatic cylinders 114 and 115 against the push of the spring 110 on the holder 50 and the spring 112 on the carrier 74. The piston rod 118 projects from the cylinder 115 and is connected to the ear 122 of the carrier by nuts 124 and 125. The piston rod 120 projects from the cylinder 114 and extends loosely through the ear 122. It carries nuts 126 and 127 two inches apart. When air is admitted to the cylinder 115, the rod 118 pushes the ear 122 four inches to the left (FIG. 7), the ear 122 picking up the nut 127 and moving it and the rod 120 two inches further to the left. If air is admitted to the cylinder 114, the piston 120 moves the ear 122 two inches to the left, carrying the nuts 124 and 125 and rod 118 with it.

Figure 8:
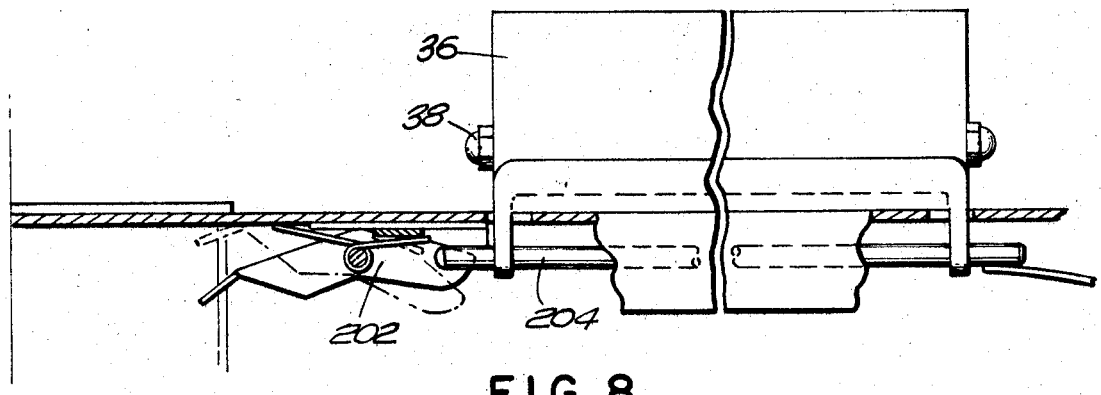
FIG. 8 is a plan view of the ejector handle, part of the table wall being shown in section.

At the forward end of the table 20 the closure member 32 is in the closed position (indicated in broken lines in FIG. 3) except when the carriage 52 is in its loading position at the forward end. Whenever the carriage moves into its loading position it engages an arm 200 which rocks about the pivot 34 with the closure member 32 so that the latter is swung up to its open position. The carriage also engages a latch 202 (FIG. 8) which underlies a rod 204 carried by the ejector handle 36, preventing operation of the ejector handle until the latch is moved by the carriage 52 to the position indicated in broken lines in FIG. 8 in which it is clear of the rod 204, permitting the rod to move down and rock a Z-piece 206 carried by the holder 50. If a cassette is then in the holder 50 it can be discharged through the opening 30 by lifting the discharge lever 36 which raises the forward end of the cassette to the opening 30 and allows the springs 66 to thrust it forward far enough to be grasped and removed.

When a cassette is to be inserted in the holder 50, the carriage and holder must be in the loading position as shown in FIGS. 1 and 2. If a 10" x 12" cassette is inserted, it fills the holder and carriage and must be inserted with its ten-inch dimension from front to rear. When the cassette enters the housing 29, its rear edge strikes the under side of the deflector plate 44 and rocks it upward, opening a normally closed switch 210 mounted on the rear wall of the housing 29 (FIG. 9). This opens the circuit through the return button 190 and thus prevents actuation of the carriage and holder until the cassette is properly seated in the holder.

When an 8" x 10" cassette is inserted in the holder 50, its proper position is against the right hand wall of the holder, but as the holder is four inches wider than the eight-inch dimension of the cassette, a cassette is apt to be inserted out of contact with the right hand side wall of the holder 50. To correct this situation, when the return button 190 is pressed, it not only results in admission of air to the cylinder 106 to send the carriage to the parking position at the rear but also results in admission of air to the four-inch cylinder 115 so that as the carriage moves to the rear, the switch track 90 moves to the left, taking with it the holder 50 which is thus shifted to its extreme position to the left, in which position the cassette will then be in contact with the right hand wall of the holder 50. A spring-pressed latch 214 is provided at the lefthand corner of the holder (FIGS. 4 and 5). This latch pivots about a vertical axis 216 and can yield to a position flush with the rear wall of the holder if a cassette is pressed against it. When the holder moves to the extreme leftward position, the latch 214 moves just beyond the left side of the cassette and is then rocked to the position shown in FIG. 5 by a spring 218. When the carriage reaches the parking position, the air is released from the cylinder 115 whereupon the springs 110 and 112 move the holder and cassette to the extreme right-hand position. The carriage and holder are then ready to take the cassette to positions for exposure. The selector knob 134 is then turned to the desired program, and the advance button 192 is pressed.

If, for example, four exposures are desired on an 8" x 12" cassette, the knob is turned to position 220 (FIG. 16). This brings the stop 156 in line with the lug 170 so that when the advance button is pressed, the carriage moves until the lug 170 strikes the stop 156 (FIG. 15). The cassette is then in the position for the first exposure. If the subject is then ready, the operator presses an exposure button 222 on the housing 29 (or a foot switch, not shown) to energize the X-ray tube for a selected period of exposure after which air is admitted to the cylinder 106 to return the carriage to the parking position, these operations being automatically performed by well-known means commonly employed in X-ray machines. When the carriage moves to the parking position the dog 184 rides in one of the grooves 182 in the cylinder 180 to turn the selector cylinder 130 (and selector knob 134) one step. The advance button 196 is then pressed by the operator to advance the carriage until the lug 170 strikes the stop 155, stopping the carriage five inches further forward than the previous advance. The cassette is then in position for the second exposure which takes place when the exposure button 222 is pressed. As before, the carrier is returned automatically to the parking position when the exposure is complete, the selector cylinder and selector knob being turned one step by the dog 184 as the carriage reaches the parking position. This time the automatic turning of the knob shaft closes a switch (not shown) which sends air into the cylinder 115 to shift the holder four inches toward the left. Pressing the advance button 196 results in the carriage being moved forward until stopped by the stop 154 in position No. 3. After the exposure the carriage returns automatically to the parking position and the selector cylinder turns to bring the stop 153 into line with the lug 170 but the holder remains four inches to the left. The next pressing of the advance button 196 brings the holder to the No. 4 position for exposure, after which the return of the carriage to the parking position steps the selector cylinder ahead so that the through groove 164 is in line with the lug 170 and the carriage can travel to the loading position when the advance button 196 is pressed. In like manner the other programs indicated on the dial 136 can be carried out.

I claim:
1. An X-ray spot-filmer comprising a table having a front wall with an aperture through which a cassette can be inserted, a carriage mounted within said table for longitudinal movement from front to rear and reverse, a cassette holder of lesser width than the carriage mounted in said carriage for front to rear movement therewith, said holder being movable transversely within said carriage, said holder and carriage being at a level substantially lower than said aperture, said holder being a three-sided rectangular frame, the open side being located at a first side of said table, a carrier mounted in the rear portion of said table and movable transversely therein, and means mechanically connecting said holder to said carrier to move transversely therewith regardless of the position of the carriage.

2. A spot-filmer as claimed in claim 1 wherein said connecting means includes a track mounted on said carrier and movable in a front-to-rear direction relatively thereto, said track having a longitudinal groove therein, and an element carried by said holder engaged in said groove and movable in a front-to-rear direction relatively thereto.

3. A spot-filmer as claimed in claim 1 including spring means urging said holder and carrier toward a second side of said table, electrically controlled pneumatic means operable to move said carrier and holder toward the first side of said table, said pneumatic means including two cylinders of different lengths with pistons connected to the carrier, the longer of said pistons being arranged to move said carrier and holder to their extreme position at the first side of said table.

4. A spot-filmer as claimed in claim 3 including electrically controlled means for causing rearward travel of said carriage and holder, said means comprising a circuit including a normally open manually operable switch, a normally closed switch openable by said carriage when it reaches the end of its rearward travel, and a relay coil, a shunt circuit including said manually operable switch and a normally open relay switch operable by said coil, a solenoid for controlling the operation of said longer piston, a circuit including said solenoid and a normally open relay switch operable by said relay coil, and a latch located at one side of said holder adapted to engage a cassette when fitted into said holder, whereby when said carriage starts its travel rearward with a cassette in the holder, the holder is moved traversely to the first side of said table during its rearward travel, the latch engages one edge of the cassette and upon arrival at the rear of the table the holder is returned with the cassette to the second side of said table.

5. A spot-filmer as claimed in claim 1, said holder having front and rear walls, spring means on said rear wall compressible by insertion of a cassette in the holder, and means operable when the holder is in the forward position to elevate the forward edge of a cassette in the holder above the front wall of the holder and to the level of said aperture whereby the cassette is impelled forward by the spring means on the rear wall of the holder.

6. An X-ray spot-filmer comprising a table having a front wall with an aperture through which a cassette can be inserted, a carriage mounted within said table for longitudinal movement from front to rear and reverse, a cassette holder of lesser width than the carriage mounted in said carriage for front to rear movement therewith, said holder being movable transversely within said carriage, said holder and carriage being at a level substantially lower than said aperture, a deflecting member mounted to the rear of said aperture for engagement by a cassette entering through the aperture electrically controlled means for causing rearward ravel of said carriage and holder, said means including a circuit having a normally closed switch engageable by said deflecting member to open when said member is pressed by a cassette partially inserted through said aperture.

References Cited

UNITED STATES PATENTS

| | | |
|---|---|---|
| 2,552,858 | 5/1951 | Mueller et al. _____ 250—66 X |
| 2,749,445 | 6/1956 | Stava et al. _____ 250—66 |
| 2,890,346 | 6/1959 | Kizaur et al._____ 250—66 |
| 3,173,008 | 3/1965 | Barrett et al. _____ 250—66 |

RALPH G. NILSON, Primary Examiner

A. L. BIRCH, Assistant Examiner